United States Patent [19]

Kniepkamp

[11] Patent Number: 5,251,813

[45] Date of Patent: Oct. 12, 1993

[54] INDICATION OF LOW BATTERY VOLTAGE CONDITION BY ALTERING OF TEMPERATURE SETPOINT

[75] Inventor: David I. Kniepkamp, Fairview Heights, Ill.

[73] Assignee: Emerson Electric Co., St. Louis, Mo.

[21] Appl. No.: 36,971

[22] Filed: Mar. 25, 1993

[51] Int. Cl.⁵ .............................................. F23N 5/20
[52] U.S. Cl. .................................... 236/46 R; 165/12
[58] Field of Search ................ 236/46 R, 47; 165/12; 364/537

[56] References Cited

U.S. PATENT DOCUMENTS 4,428,528  1/1984  Renault ........................... 236/46 R
4,506,827  3/1985  Jamieson et al. ................ 165/12 X Primary Examiner—William E. Wayner
Attorney, Agent, or Firm—Paul A. Becker, Sr.

[57] ABSTRACT

In a digital thermostat powered solely by batteries, when the battery voltage drops to a predetermined value, the thermostat effects a visual indication of the existence of a low voltage condition. If the batteries are not replaced within a predetermined time period thereafter, and the battery voltage remains adequate to operate the thermostat, the temperature setpoint is automatically altered by being lowered, if in the heating mode, or being raised, if in the cooling mode. The change in room temperature resulting from the change in temperature setpoint should prompt the user to replace the batteries. By proper manipulation of user operable means, the user can subsequently cancel the altered temperature setpoint and re-establish the desired temperature setpoint so as to provide for normal thermostat operation for a predetermined time period during which the batteries can be replaced.

9 Claims, 3 Drawing Sheets

INDICATION OF LOW BATTERY VOLTAGE CONDITION BY ALTERING OF TEMPERATURE SETPOINT

BACKGROUND OF THE INVENTION

This invention relates to digital thermostats powered solely by battery means, and particularly to an improved means therein for indicating a low battery voltage condition.

In digital thermostats powered solely by battery means, it is necessary that the batteries (or battery) be replaced before the battery voltage drops to a value insufficient to enable proper operation of the thermostat. While it is recommended that the batteries be replaced at specific intervals so as to minimize the possibility of the occurrence of such a voltage condition, it is believed that such recommendations are typically ignored. Accordingly, it is deemed necessary to provide some means for indicating to the thermostat user that the battery voltage is approaching such a value.

One requirement of such indicating means is that it be activated a sufficient time before the battery voltage drops to a value insufficient to enable proper operation of the thermostat so as to provide ample time for the user to purchase and install new batteries. Another requirement is that it readily attract the attention of the user. Another requirement is that it not result in the use of more electrical energy than is used in normal thermostat operation, which additional energy use would shorten the remaining life of the batteries. Yet another requirement is that it be relatively inexpensive.

SUMMARY OF THE INVENTION

A primary object of this invention is to provide, in a digital thermostat powered solely by battery means, a new and improved means for indicating a low battery voltage condition.

In accordance with the present invention, a digital thermostat powered solely by batteries includes a microcomputer and various circuitry connected thereto. When the battery voltage drops to a predetermined value, circuit means connected to the microcomputer and responsive to the battery voltage provides an indication to the microcomputer that a low battery voltage condition now exists. The microcomputer is programmed to respond to the start of the low battery voltage condition by causing the word "battery" to be visually displayed in an LCD (liquid crystal display) connected thereto. Typically, the thermostat user would observe the visual display and, within a few days thereafter, would replace the batteries. However, if the user does not observe the visual display or, for some reason, does not replace the batteries, the microcomputer logic provides for approximately four weeks of such visual display. If the batteries have not been replaced by the end of the four week time period, the temperature setpoint is automatically altered. Specifically, if the thermostat is in the heating mode, the setpoint is automatically lowered 10° F.; if in the cooling mode, the setpoint is automatically raised 10° F. It is believed that the appreciable change in room temperature resulting from such a change in setpoint would be observed by the user, thus prompting the user to replace the batteries. Since the altering of the temperature setpoint may be the first indication of the low battery voltage condition that was observed by the user, the microcomputer is programmed so that, by proper manipulation of user operable programming means connected to the microcomputer, the user can cancel the altered setpoint and re-establish, for approximately one week, the original setpoint. It is believed that the time period of one week should be ample time to replace the batteries.

The above mentioned and other objects and features of the present invention will become apparent from the following description when read in conjunction with the accompanying drawings.

DESCRIPTION OF THE PREFERRED EMBODIMENT

Figure 1:
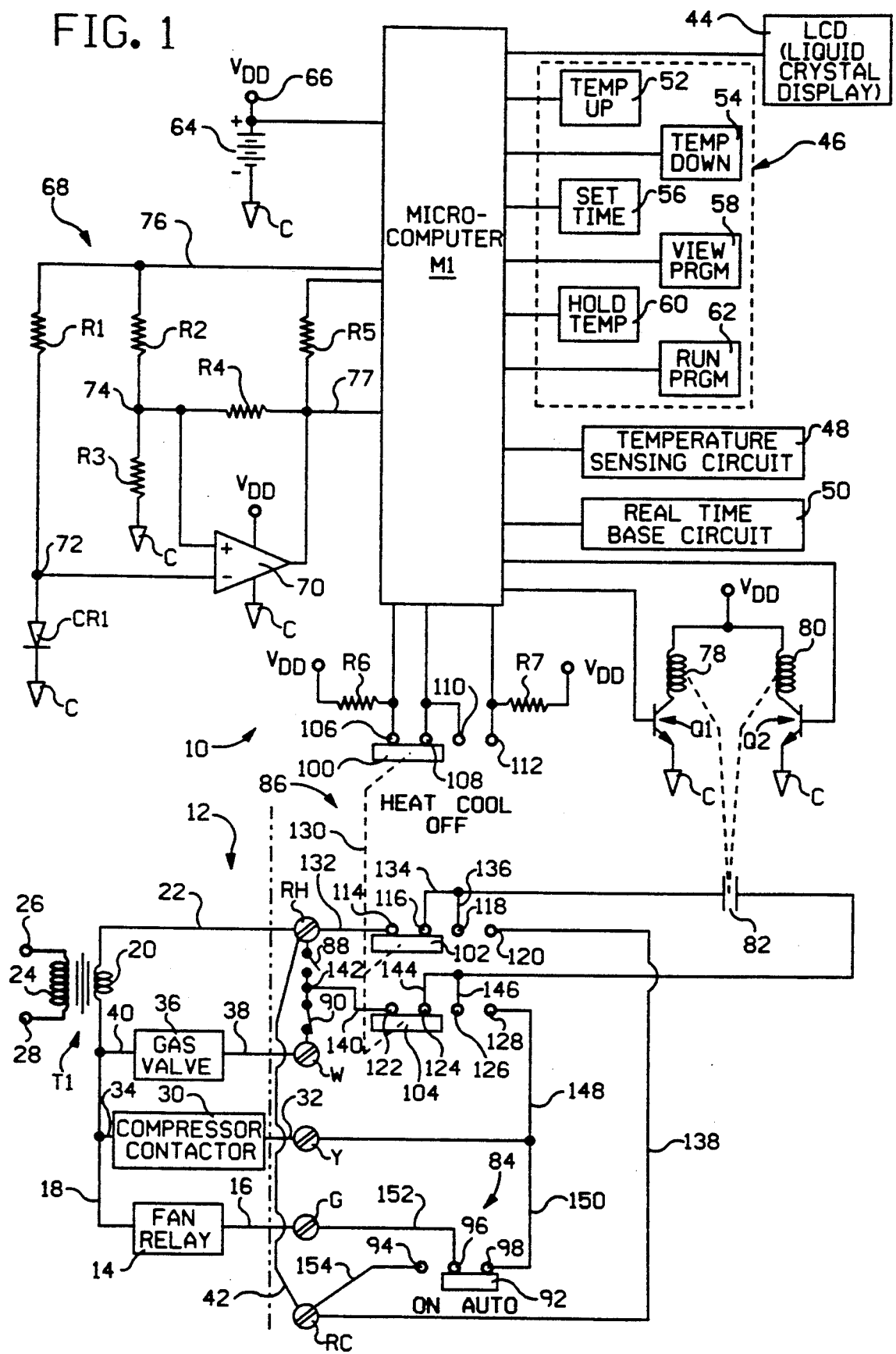
FIG. 1 is a schematic illustration, largely in block form, of a digital thermostat incorporating the present invention and shown connected to a heating and cooling apparatus.

Referring to FIG. 1, shown generally at 10 is a digital thermostat for controlling operation of heating and cooling apparatus shown generally at 12. Thermostat 10 is provided with screw terminals RH, W, Y, G and RC to which apparatus 12 is connected. Apparatus 12 includes a fan relay 14 which is connected by a lead 16 to terminal G and by a lead 18 to one end of the low voltage secondary winding 20 of a voltage step-down transformer T1. The other end of secondary winding 20 is connected by a lead 22 to terminal RH. The primary winding 24 of transformer T1 is connected across terminals 26 and 28 of a conventional 120 volt alternating current power source.

Apparatus 12 also includes a compressor contactor 30 which is connected by a lead 32 to terminal Y and by a lead 34 and lead 18 to one end of secondary winding 20. Apparatus 12 further includes a gas valve 36 which is connected by a lead 38 to terminal W and by a lead 40 and lead 18 to one end of secondary winding 20. A removable wire jumper 42 is connected between terminals RH and RC. As is well known in the art, wire jumper 42 is removed in the event that apparatus 12 includes two transformers instead of one.

While thermostat 10 may take many forms in embodying the invention, a preferred construction is shown in FIG. 1. For brevity, only those features believed necessary or helpful to enable understanding of the present invention are shown and hereinafter described.

Thermostat 10 includes a programmable microcomputer M1. In the preferred embodiment, microcomputer M1 is an NEC μPD7503, which is a CMOS 4-bit single chip device and which includes an ALU (arithmetic logic unit), an accumulator, a 4096×8-bit ROM (real only memory), a 224×4-bit RAM (random access read/write memory), an 8-bit timer/event counter, a display controller/driver, and 23 I/O (input/output) lines.

Connected to microcomputer M1 are an LCD 44, a plurality of buttons and/or keys indicated generally at 46, a temperature sensing circuit 48, and a real time base circuit 50.

LCD 44 provides a plurality of display elements for designating time and temperature plus various other information including a designation of the existence of a low battery voltage condition.

The plurality of buttons and/or keys 46, hereinafter referred to as buttons, comprises individual buttons 52, 54, 56, 58, 60 and 62 identified as TEMP UP, TEMP DOWN, SET TIME, VIEW PRGM, HOLD TEMP and RUN PRGM, respectively. Buttons 46 enable the user to program microcomputer M1 so as to provide a desired time-temperature schedule of operation of thermostat 10. As will hereinafter be described, selected ones of buttons 46 also enable the user to cancel an altered temperature setpoint condition caused by a low battery voltage.

Temperature sensing circuit 48 includes a thermistor (not shown) in circuit with an oscillator (not shown), the output frequency of which is a function of the ambient temperature sensed by the thermistor. The output frequency is measured by microcomputer M1 and converted to a measurement of degrees of temperature. Real time base circuit 50 includes a crystal oscillator (not shown) and provides an accurate time base for all real time functions.

Three 1.5 volt batteries 64, preferably "AA" size alkaline batteries, are connected to microcomputer M1 and provide the sole source of electrical power thereto. The nominal 4.5 volt source is identified at terminal 66 as voltage $V_{DD}$.

Also connected to microcomputer M1 is a circuit 68 for detecting a low battery voltage condition. The circuit comprises resistors R1, R2, R3, R4 and R5, a comparator 70, and a controlled rectifier CR1. The inverting pin of comparator 70 is connected to the junction 72 of resistor R1 and rectifier CR1. The non-inverting pin of comparator 70 is connected to the junction 74 of resistors R2 and R3. In operation, microcomputer M1 provides a voltage, essentially the voltage at voltage source $V_{DD}$, on a lead 76. The voltage divider of resistor R1 and rectifier CR1 establishes a reference voltage on the inverting pin of comparator 70, and the voltage divider of resistors R2 and R3 establishes a voltage, the value of which depends on the value of the voltage source $V_{DD}$, on the non-inverting pin of comparator 70. When the voltage source $V_{DD}$ is sufficiently high, the output of comparator 70, which is connected to microcomputer M1 by a lead 77, is high. Should the voltage source $V_{DD}$ decrease to a sufficiently low value, the output of comparator 70 goes low. Typically, when the battery voltage drops to approximately 3.2 volts, circuit 68 will indicate that a low battery voltage condition exists. Resistor R4 provides hysteresis so as to prevent rapid high-low operation of comparator 70 output. Resistor R5 provides a pull-up resistor for comparator 70.

The base of an NPN transistor Q1 and the base of an NPN transistor Q2 are connected to microcomputer M1. A first coil 78 is connected in series with the emitter-collector of transistor Q1 between voltage source $V_{DD}$ and common C, and a second coil 80 is connected in series with the emitter-collector of transistor Q2 between voltage source $V_{DD}$ and common C. Coils 78 and 80, along with associated contacts 82 controlled thereby, comprise a latching relay. Basically, a momentary energizing of one of the coils 78 and 80 causes contacts 82 to open, and a momentary energizing of the other of the coils 78 and 80 causes contacts 82 to close. Since energizing is momentary instead of continuous, such a latching relay conserves electrical power.

Thermostat 10 further includes a fan switch 84, a system selector switch 86, a normally-open switch 88, and a normally-closed switch 90.

Fan switch 84 is a two-position switch having an ON and an AUTO position. Switch 84 comprises a movable shorting bar 92 and stationary contacts 94, 96, and 98. In the ON position, shorting bar 92 connects contacts 94 and 96. In such a position, fan relay 14 is directly energized by secondary winding 20 of transformer T1 so that the fan (not shown) runs continuously. In the AUTO position, wherein shorting bar 92 connects contacts 96 and 98, fan relay 14 is energized only on a demand for cooling when in the cooling mode. With fan switch 84 in the AUTO position and when the system is in the heating mode, the fan is controlled by a temperature and/or time switch (not shown) on the furnace.

System selector switch 86 is a three-pole, three-position switch having HEAT, OFF, and COOL positions. Switch 86 comprises three movable shorting bars 100, 102, and 104, and a plurality of stationary contacts 106, 108, 110, 112, 114, 116, 118, 120, 122, 124, 126, and 128. Shorting bars 100, 102, and 104 are mechanically connected together at 130. In the HEAT position, shorting bar 100 connects contacts 106 and 108, bar 102 connects contacts 114 and 116, and bar 104 connects contacts 122 and 124. In the OFF position, shorting bar 100 connects contacts 108 and 110, bar 102 connects contacts 116 and 118, and bar 104 connects 124 and 126. In the COOL position, shorting bar 100 connects contacts 110 and 112, bar 102 connects contacts 118 and 120, and bar 104 connects contacts 126 and 128.

Terminals 106, 108, 110, and 112 of system selector switch 86 are connected to microcomputer M1. Also, terminal 106 is connected through a resistor R6 to voltage source $V_{DD}$ and terminal 112 is connected through a resistor R7 to voltage source $V_{DD}$ so as to provide means for indicating to microcomputer M1 the instant position, HEAT, OFF, or COOL, of system selector switch 86.

Normally-open switch 88 and normally-closed switch 90 are connected in series between terminals RH and W. Switch 88 is a temperature responsive switch which closes its contacts in the event the space temperature drops below 40° F. Switch 90 is a temperature responsive switch which opens its contacts in the event the space temperature rises above 100° F.

Terminal 114 of system selector switch 86 is connected by a lead 132 to terminal RH. Terminal 116 of switch 86 is connected by a lead 134 to one side of latching relay contacts 82. Terminal 118 of switch 86 is connected to lead 134 by a lead 136. Terminal 120 of switch 86 is connected by a lead 138 to terminal RC.

Terminal 122 of switch 86 is connected by a lead 140 to a junction 142 between switches 88 and 90. Terminal 124 of switch 86 is connected by a lead 144 to one side of latching relay contacts 82. Terminal 126 is connected to lead 144 by a lead 146. Terminal 128 of switch 86 is connected by a lead 148 to terminal Y, and by lead 148 and a lead 150 to terminal 98 of fan switch 84. Terminal 96 of fan switch 84 is connected by a lead 152 to terminal G, and terminal 94 of switch 84 is connected by a lead 154 to terminal RC.

To place thermostat 10 in the heating mode requires that system selector switch 86 be moved to its HEAT position. When in the heating mode, thermostat 10 compares the value of the room temperature, as provided by temperature sensing circuit 48, with the instant temperature setpoint. When the comparison indicates that heating is required, microcomputer M1 provides an enabling signal to the latching relay which causes contacts 82 of the latching relay to close. With contacts 82 closed, gas valve 36 is energized through contacts 82, selector switch 86, and switch 90. When the comparison indicates no heating is required, contacts 82 are opened, causing de-energizing of gas valve 36.

Voltage source $V_{DD}$, which is the voltage across batteries 64, provides the sole power source for operating microcomputer M1. If the value of voltage source $V_{DD}$ drops below approximately 2.5 volts, it can no longer operate microcomputer M1. Therefore, if the voltage source $V_{DD}$ drops below 2.5 volts, microcomputer M1 can no longer effect operation of the latching relay so that relay contacts 82 remain in whatever position they are in when the low voltage condition arises. It is noted that if relay contacts 82 remain open, the space temperature decreases. Eventually, the contacts of switch 88 will close, effecting energizing of gas valve 36. Such closing occurs at approximately 40° F., thereby providing some measure of protection in that such operation should provide sufficient heat to prevent freezing of water pipes. If relay contacts 82 remain closed, the space temperature rises. Eventually, the contacts of a limit switch (not shown) will open, effecting de-energizing of gas valve 36. If for some reason the room temperature rises above 100° F. and gas valve 36 is still energized, the contacts of switch 90 will open, thereby de-energizing gas valve 36.

As will hereinafter be described, thermostat 10 is constructed so as to provide, before the battery voltage can drop to the level at which it can no longer operate microcomputer M1, means for indicating that the battery voltage has dropped to a value at which the batteries should be replaced so as to ensure continued normal operation of thermostat 10.

Operation of thermostat 10 is controlled by a set of instructions programmed into the ROM of microcomputer M1, and by information entered into the RAM of microcomputer M1 by the user by means of buttons 46. By proper manipulation of buttons 46, the user can establish a desired time-temperature schedule for controlling heating and cooling apparatus 12.

Assume thermostat 10 has been programmed to provide, in the heating mode, and for each day of the week, a time-temperature schedule as follows: 68° F. beginning at 6:00 a.m.; 60° F. beginning at 8:00 a.m.; 70° F. beginning at 4:00 p.m.; and 62° F. beginning at 11:00 p.m. So long as the value of voltage source $V_{DD}$ remains sufficiently high, thermostat 10 maintains the programmed time-temperature schedule.

Thermostat 10 is programmed to perform the previously described comparison of the value of the room temperature with the instant temperature setpoint once every sixty seconds. Also at such time, the signal on lead 77 is checked. If the signal on lead 77 is high, indicating that the voltage source $V_{DD}$ is sufficiently high, microcomputer M1 causes LCD 44 to continuously display the programmed temperature setpoint and to alternately display current time and room temperature. If the signal on lead 77 is low, indicating that the previously described low battery voltage condition exists, microcomputer M1 causes LCD 44 to continuously display the word "battery," and to no longer display the time and temperature information.

Figure 2:
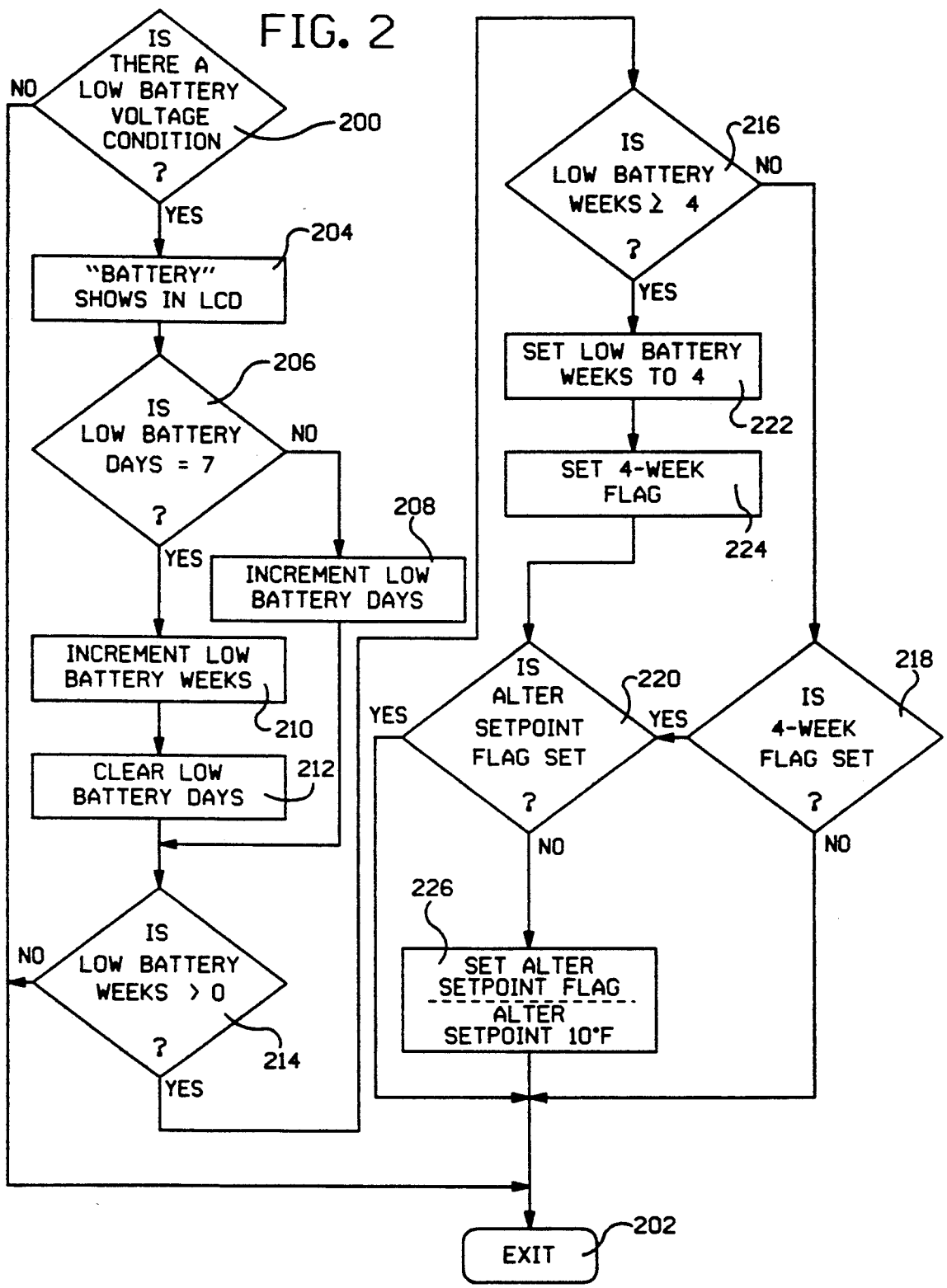
FIG. 2 is a flow chart depicting logic programmed into and executed by the thermostat of FIG. 1 to effect altering of the temperature setpoint.

Referring to FIG. 2, shown therein is a routine repetitively executed by microcomputer M1 once each day at midnight. The first logic inquiry 200 in FIG. 2 is whether there is a low battery voltage condition. If the answer to logic inquiry 200 is no, the routine exits at 202. If the answer is yes, the word "battery" is displayed in LCD 44 as shown in step 204. It is noted that, unless the low battery voltage condition first occurred at midnight, the word "battery" will already be displayed in LCD 44. Thus, step 204 simply indicates that the word "battery" continues to be shown.

The next logic inquiry 206 is whether the count value in the low battery days counter is equal to seven. If not, the counter is incremented by one at 208. If yes, a low battery weeks counter is incremented by one at 210 and the low battery days counter is cleared at 212.

The next inquiry 214 is whether the count value in the low battery weeks counter is greater than zero. If not, the routine exits at 202. If yes, the logic proceeds to an inquiry at 216 as to whether the count value in the low battery weeks counter is greater than or equal to four. If no, the logic proceeds to an inquiry 218 as to whether a 4-week flag is set. If the 4-week flag is not set, the routine exits at 202; if the 4-week flag is set, the logic proceeds to an inquiry 220 as to whether an alter setpoint flag is set. If the count value in the low battery weeks counter is greater than or equal to four in logic inquiry 216, the low battery weeks counter is set to four in logic step 222, and the 4-week flag is set at step 224.

After logic step 224, the logic proceeds to the inquiry 220 as to whether an alter setpoint flag is set. If the alter setpoint flag is not set, it is set in logic step 226, and the temperature setpoint is altered by 10° F. Specifically, if in the heating mode, the set point is lowered 10° F.; if in the cooling mode, the setpoint is raised 10° F. If the answer to the logic inquiry 220 is yes, the routine exits at 202.

When the low battery voltage condition is detected, the word "battery" is displayed in LCD 44 and the time and temperature information is no longer displayed. This condition provides a visual indication to the user that batteries 64 should be replaced. The user might not observe this condition or may simply procrastinate replacing batteries 64. Accordingly, the routine of FIG. 2 allows for this condition to exist for twenty-eight days. At midnight of the twenty-eighth day, the setpoint is altered.

The altering of the setpoint applies to all the setpoints for the various time periods. While the starting times remain the same, the setpoints of the previously described programmed schedule of 68° F. at 6:00 a.m., 60° F. at 8:00 a.m., 70° F. at 4:00 p.m., and 62° F. at 11:00 p.m. are altered to 58° F. at 6:00 a.m., 50° F. at 8:00 a.m., 60° F. at 4:00 p.m., and 52° F. at 11:00 p.m. If the user is in the dwelling, it is believed reasonable to expect that the user would soon detect the altered setpoint condition and would replace batteries 64 as soon as possible.

Since it may not be possible to replace batteries 64 at the time the altered setpoint condition is initially observed, the present invention includes means for enabling the user to cancel the altered setpoint condition and reestablish the desired setpoints in the time-temperature schedule for a limited time period. The limited time period, one week in the preferred embodiment, should provide ample time to replace batteries 64.

Figure 3:
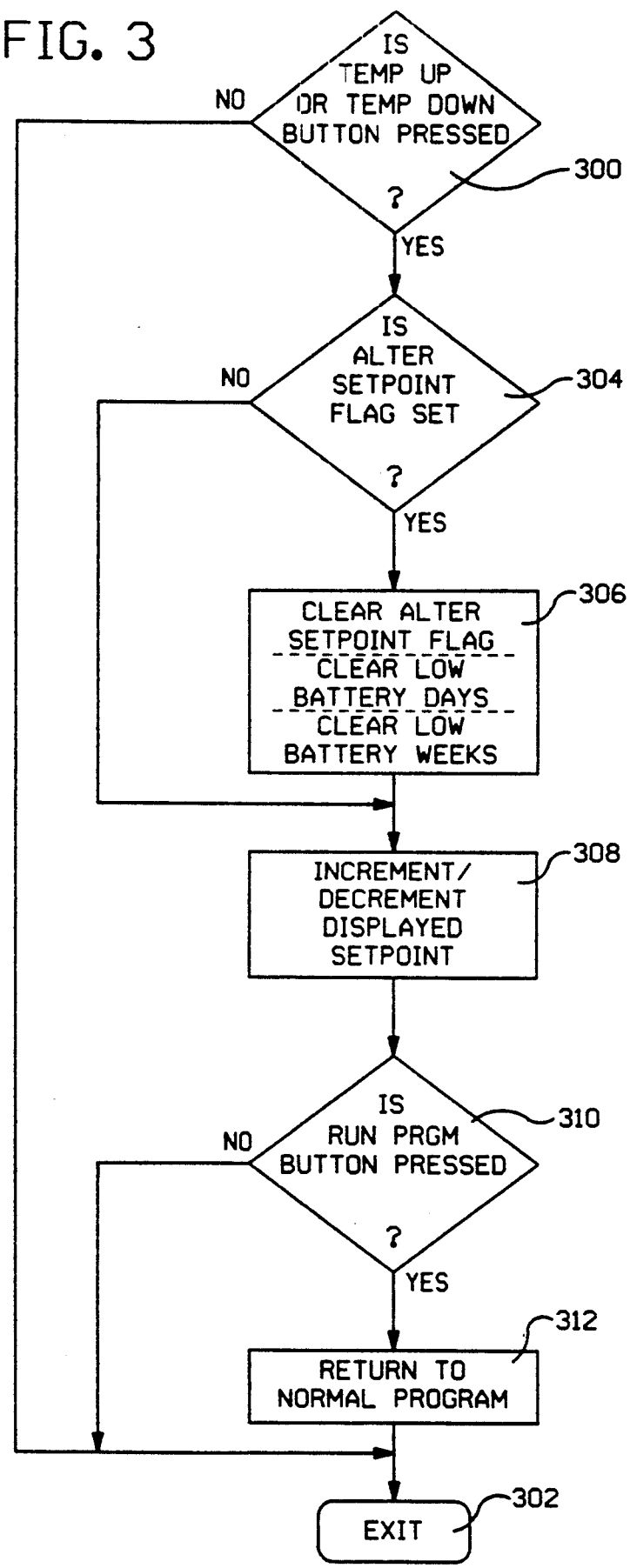
FIG. 3 is a flow chart depicting a programmed logic sequence by which the altered setpoint condition effected by the logic of FIG. 2 may be canceled and normal thermostat operation re-established.

Specifically, referring to FIG. 3, the first logic inquiry 300 therein is whether the TEMP UP button 52 or TEMP DOWN button 54 is being pressed. If the answer to inquiry 300 is no, the routine exits at 302; if the answer is yes, the next inquiry 304 is whether the alter setpoint flag is set. In the illustrative example described above, the alter setpoint flag was set at logic step 226 in FIG. 2. Therefore, in accordance with the logic of FIG. 3, the alter setpoint flag is cleared at step 306. The low battery days counter and the low battery weeks counter are also cleared at step 306. It is noted that the 4-week flag, a flag that was set in step 224 in FIG. 2, is not cleared.

Each time TEMP UP button 52 or TEMP DOWN button 54 is pressed, the setpoint value displayed in LCD 44 increments or decrements, respectively, by 1° F. in logic step 308. For example, if the TEMP UP button 52 were pressed at 7:00 a.m., the alter setpoint flag would be cleared at 306, and the setpoint value would increase from the altered setpoint of 58° F. to a new setpoint of 59° F. The setpoint value of 59° F. would be displayed in LCD 44 for a few seconds, after which time only the word "battery" would appear.

The next logic inquiry 310 is whether the RUN PRGM button 62 is being pressed. If it is not being pressed, the routine exits at 302; if it is pressed, the logic executed at step 312 is to return to the normal program. For example, in the illustrative example, logic step 308 established, at 7:00 a.m., a new setpoint of 59° F. If the RUN PRGM button 62 is not pressed in logic step 310, the setpoint of 59° F. remains in effect until 8:00 a.m., at which time the "normal" programmed temperature setpoint 60° F. for the time period starting at 8:00 a.m. is again in effect. If the RUN PRGM button 62 were pressed in logic step 310, the "normal" programmed temperature setpoint 68° F. for the time period between 6:00 a.m. and 8:00 a.m. would immediately be in effect. Thus, if the RUN PRGM button 62 is pressed, thermostat 10 returns immediately to the "normal" program; if button 62 is not pressed, the return to the "normal" program occurs at the beginning of the next scheduled time period. It is noted that, alternatively, in order to immediately establish 68° F. as the setpoint at 7:00 a.m., the TEMP UP button 52 could be repeatedly pressed at logic step 300 until LCD 44 displayed the setpoint value of 68° F. in step 308.

In accordance with FIG. 2, the return to the "normal" program effected by the logic of FIG. 3 will provide for seven days of "normal" operation. Such a seven-day time period should provide ample time to replace batteries 64. If the batteries 64 are not replaced, "normal" operation will terminate on the seventh day. Specifically, at midnight on the seventh day, low battery weeks count equals one (logic step 210), low battery weeks count of one is greater than zero (logic step 214), low battery weeks count of one is not equal to or greater than four (logic step 216), the 4-week flag is set (logic step 218), and the alter setpoint flag is not set (logic step 220). Therefore, in accordance with logic step 226, the alter setpoint flag is again set and the setpoint is again altered.

It is noted that if the user is not in the dwelling while the altered setpoint condition exists, the energy requirement placed on batteries 64 is slightly less than it is under normal program operation. That is to say, since the altered setpoints are lower in heating and higher in cooling than the desired setpoints, apparatus 12, and thus the latching relay, is operated less frequently. Since the latching relay is a primary energy drain on batteries 64, less frequent energizing of the latching relay reduces the energy requirement on batteries 64 and thus tends to extend the useful life of batteries 64.

As previously stated, the low battery voltage condition referred to in logic step 200 in FIG. 2 is initiated when the battery voltage drops to approximately 3.2 volts. This low battery voltage condition can continue until the battery voltage drops to approximately 2.5 volts. At 2.5 volts, microcomputer M1 ceases to function, and thereafter, thermostat 10 provides only the low temperature and high temperature protection of switches 88 and 90, respectively, as previously described. While the length of time required for the voltage of batteries 64 to drop to various voltage levels is not known precisely, it is expected that it would take approximately eighteen months to drop from 4.5 volts to 3.2 volts and approximately six months to drop from 3.2 volts to 2.5 volts.

While it is preferred to provide a limited time period from the time the low battery voltage condition is initially detected to the time when the temperature setpoints are altered, it is to be understood that such a limited time period could be eliminated. That is to say, the routines of FIGS. 2 and 3 could be modified to effect altering of the setpoint at midnight of the first day on which the low battery voltage condition exists. Such a modified routine would retain the feature of allowing the altered setpoint condition to be canceled and the desired setpoints to be re-established so as to allow sufficient time, during which a "normal" program is executed, to replace the batteries.

I claim:

1. In a digital thermostat powered solely by battery means,
    means for establishing a desired temperature setpoint;
    means for detecting a low voltage condition of the battery means, which low voltage condition is adequate for enabling operation of the thermostat; and
    means for establishing an altered temperature setpoint in response to said low voltage condition.

2. The thermostat claimed in claim 1 further including means for enabling canceling of said altered temperature setpoint and re-establishing of said desired temperature setpoint while said low voltage condition exists.

3. In a digital thermostat powered solely by battery means and operable for controlling heating and/or cooling apparatus,
    means for establishing desired temperature setpoints in a time-temperature schedule;
    means for detecting a low voltage condition of the battery means, which low voltage condition is adequate for enabling operation of the thermostat;
    means for visually indicating, for a first predetermined time period, existence of said low voltage condition; and
    means for establishing altered temperature setpoints after expiration of said first predetermined time period while said low voltage condition exists.

4. The thermostat claimed in claim 3 wherein said altered temperature setpoints are approximately 10° F. below said desired temperature setpoints when the thermostat is in a heating mode and approximately 10° F. above said desired temperature setpoints when the thermostat is in a cooling mode.

5. The thermostat claimed in claim 3 further including means for enabling canceling of said altered temperature setpoints and re-establishing of said desired temperature setpoints for a second predetermined time period while said low voltage condition exists.

6. The thermostat claimed in claim 5 further including means for enabling re-establishing of said altered temperature setpoints after expiration of said second predetermined time period while said low voltage condition exists.

7. The thermostat claimed in claim 6 wherein said first predetermined time period is approximately four weeks and said second predetermined time period is approximately one week.

8. In a digital thermostat powered solely by battery means,
- a microcomputer;
- user operable means connected to said microcomputer for establishing desired setpoint temperatures in a time-temperature schedule; and
- circuit means connected to said microcomputer for detecting a low voltage condition of the battery means, which low voltage condition is adequate for enabling operation of the thermostat,
- said microcomputer being programmed to effect establishing of altered temperature setpoints in response to said low voltage condition.

9. The thermostat claimed in claim 8 wherein said microcomputer is further programmed to effect, in conjunction with proper manipulation of said user operable means, canceling of said altered temperature setpoints and reestablishing of said desired temperature setpoints while said low voltage condition exists.

* * * * *